United States Patent
Choi et al.

(10) Patent No.: US 8,069,010 B2
(45) Date of Patent: Nov. 29, 2011

(54) METHOD AND APPARATUS FOR PREDICTING USER PREFERENCE

(75) Inventors: Sung-hwan Choi, Seoul (KR); Cheol-ju Hwang, Yongin-si (KR); Jae-hwang Lee, Seoul (KR); Jeong-rok Jang, Suwon-si (KR); Yun-ju Choe, Suwon-si (KR); Do-yeon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 622 days.

(21) Appl. No.: 12/174,081

(22) Filed: Jul. 16, 2008

(65) Prior Publication Data

US 2009/0150120 A1    Jun. 11, 2009

(30) Foreign Application Priority Data

Dec. 6, 2007  (KR) .......................... 10-2007-0126397

(51) Int. Cl.
*G06F 17/15* (2006.01)

(52) U.S. Cl. ........................................ 702/179; 707/785

(58) Field of Classification Search .................. 702/127, 702/179, 194–199; 707/765
See application file for complete search history.

(56) References Cited

U.S. PATENT DOCUMENTS 7,689,556 B2 * 3/2010 Garg et al. .................... 707/765

* cited by examiner

*Primary Examiner* — John H Le
(74) *Attorney, Agent, or Firm* — Staas & Halsey LLP

(57) ABSTRACT

A method and apparatus for predicting content preferences of an active user with reference to content preferences of other users that are similar to those of the active user, the method including: measuring similarity ratios of the active user and other users using an overlapping ratio of use of content items commonly used between the active user and the respective other users; generating a recommender list for the active user based on the measured similarity ratios; and predicting a preference rating of the first user with respect to an unused content item based on a preference rating of an other user included in the recommender list with respect to the unused content item. Accordingly, the similarity ratio between the users can be accurately measured so that reliability of a preference rating prediction system can be increased.

25 Claims, 2 Drawing Sheets

METHOD AND APPARATUS FOR PREDICTING USER PREFERENCE

CROSS-REFERENCE TO RELATED APPLICATIONS

This application claims all benefits accruing under 35 U.S.C. §119 from Korean Patent Application No. 2007-126397, filed on Dec. 6, 2007, in the Korean Intellectual Property Office, the disclosure of which is incorporated herein by reference.

BACKGROUND OF THE INVENTION

1. Field of the Invention

Aspects of the present invention relate to a method of predicting a user preference, and more particularly, to a method and apparatus of accurately predicting a user's preference for content items in measuring similarities between content users.

2. Description of the Related Art

Due to advances in technology, the storage capacity of multimedia apparatuses has steadily increased. As a result, content has become more accessible to users of the multimedia apparatuses. Generally, in this multimedia age, the amount and variety of available content has also increased.

Due to such a quantitative increase in available contents, it can be difficult to find information that is useful to a particular individual. Accordingly, various methods of mechanically predicting preferences of active users with respect to corresponding contents have been attempted. However, the most difficult problem has been to increase an accuracy of prediction values in a preference prediction system.

SUMMARY OF THE INVENTION

Aspects of the present invention provide a method of predicting content preferences of active users with reference to content preferences of other users that are similar to those of active users so as to increase an accuracy of a preference rating prediction system. Aspects of the present invention also provide a method and apparatus for accurately predicting user preferences by designing a measuring method with higher reliability than that of a conventional method.

Additional aspects and/or advantages of the invention will be set forth in part in the description which follows and, in part, will be obvious from the description, or may be learned by practice of the invention.

In accordance with an example embodiment of the present invention, there is provided a method of predicting a user preference of an active user for an unused content item not used by the active user, the method including: measuring a first similarity ratio of the active user and a first other user using an overlapping ratio of use of content items commonly used between the active user and the first other user, and measuring a second similarity ratio of the active user and a second other user using the overlapping ratio of use of content items commonly used between the active user and the second other user; generating a recommender list for the active user based on the measured first and second similarity ratios; and predicting a preference rating of the active user with respect to the unused content item based on a preference rating of the first or second other user included in the recommender list with respect to the unused content item.

According to an aspect of the present invention, the measuring of the first and second similarity ratios may include, for each of the similarity ratios, multiplying the overlapping ratio of use of the content items by a correlation coefficient between the active user and the corresponding other user.

According to an aspect of the present invention, the overlapping ratio of use may be a ratio of a number of the content items commonly used by the active user and the corresponding other user to a total number of content items used by the active user and the corresponding other user.

According to an aspect of the present invention, the overlapping ratio of use of the first items may be a ratio of a number of the content items commonly used by the active user and the corresponding other user to a total number of content items used by the active user and the corresponding other user, multiplied by the number of the content items commonly used by the active user and the corresponding other user to a total number of content items used by the active user.

According to an aspect of the present invention, the recommender list may include the first other user and the second other user arranged in order of decreasing similarity with the active user according to the measured first and second similarity ratios.

According to an aspect of the present invention, the predicting of the preference rating of the active user with respect to the unused content item may include using the preference rating of the other user having a greatest similarity with the active user according to the recommender list with respect to the unused content item.

According to an aspect of the present invention, the correlation coefficient may be a Pearson correlation coefficient.

In accordance with another example embodiment of the present invention, there is provided an apparatus for predicting a user preference of an active user for an unused content item not used by the active user, the apparatus including: a similarity ratio operator to measure a first similarity ratio of the active user and a first other user using an overlapping ratio of use of content items commonly used between the active user and the first other user, and to measure a second similarity ratio of the active user and a second other user using the overlapping ratio of use of content items commonly used between the active user and the second other user; a recommender list generating unit to generate a recommender list for the active user based on the measured first and second similarity ratios; and a user predicted preference rating determining unit to predict a preference rating of the active user with respect to the unused content item based on a preference rating of the first or second other user included in the recommender list with respect to the unused content item.

In accordance with yet another example embodiment of the present invention, there is provided a method of predicting a user preference of an active user for an unused content item not used by the active user, the method including: measuring a first similarity ratio of the active user and a first other user using an overlapping ratio of use of content items commonly used between the active user and the first other user, and measuring a second similarity ratio of the active user and a second other user using the overlapping ratio of use of content items commonly used between the active user and the second other user; determining a most similar other user from among the first and second other users according to the measured first and second similarity ratios; and predicting a preference rating of the active user with respect to the unused content item based on a preference rating of the most similar other user with respect to the unused content item.

In accordance with still another example embodiment of the present invention, there is provided An apparatus for predicting a user preference of an active user for an unused content item not used by the active user, the apparatus including: a similarity ratio operator to measure a first similarity ratio of the active user and a first other user using an overlapping ratio of use of content items commonly used between the active user and the first other user, and to measure a second similarity ratio of the active user and a second other user using the overlapping ratio of use of content items commonly used between the active user and the second other user; a most similar other user determiner to determine a most similar other user from among the first and second other users according to the measured first and second similarity ratios; and a user predicted preference rating determining unit to predict a preference rating of the active user with respect to the unused content item based on a preference rating of the most similar other user with respect to the unused content item.

In accordance with another example embodiment of the present invention, there is provided a method of predicting a user preference of an active user for an unused content item not used by the active user, the method including: measuring a first similarity ratio of the active user and a first other user and a second similarity ratio of the active user and a second other user, the first and second similarity ratios considering an overlapping extent of use of content items commonly used by the active user and the corresponding other user; determining a most similar other user from among the first and second other users according to the measured first and second similarity ratios; and predicting a preference rating of the active user with respect to the unused content item based on a preference rating of the first or second other user included in the recommender list with respect to the unused content item.

In accordance with another example embodiment of the present invention, there is provided a computer readable recording medium having embodied thereon a computer program for executing one of the methods of predicting a user preference as described above.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figures 1, 2:
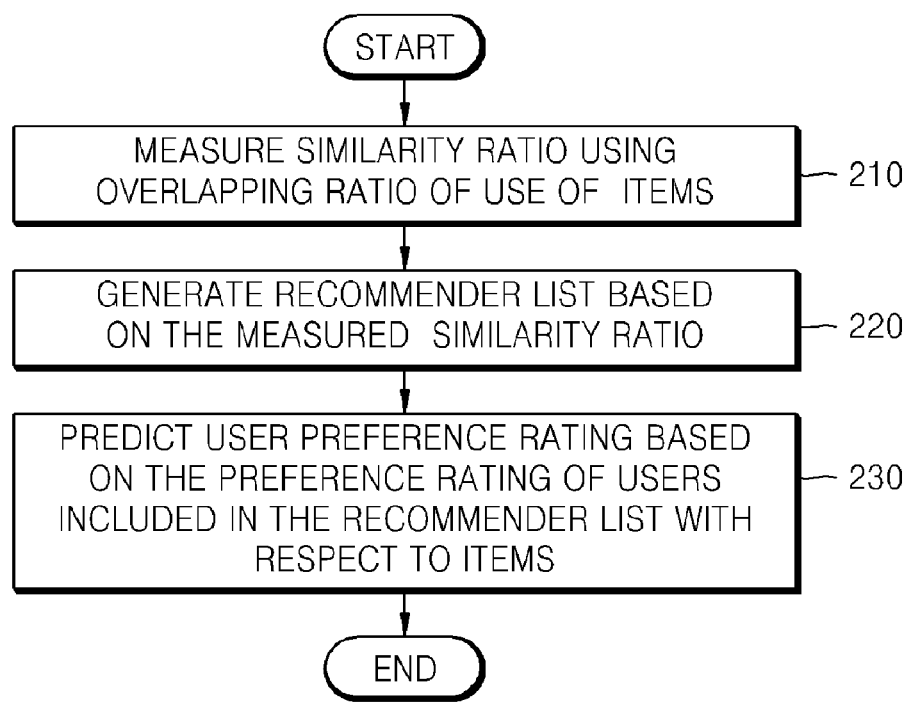
FIG. 1 is a table illustrating preference data of users U1-U5 for contents C1-C5 according to an example embodiment of the present invention.
FIG. 2 is a flowchart illustrating a method of predicting a user preference, according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a table 100 illustrating preference data of five users 120 U1-U5 for five content items 110 C1-C5 according to an example embodiment of the present invention. The five content items 110 C1-C5 may include digital broadcasts, movies, dramas, music, and/or home shopping products. Moreover, these items C1-C5 may be capable of being evaluated according to tastes and preferences of users (such as travelling destinations, celebrities, etc.).

Referring to FIG. 1, each score (i.e., entry) in the table 100 indicates a preference from 1 to 5. Here, 1 is the lowest score and may denote the lowest preference and 5 is the highest score and may denote the highest preference. The items represented by x denote that such items have never been used by the corresponding user. Hereinafter, in the current description, the degree to which users prefer a corresponding item is represented by the term "preference rating," and the preference rating is defined by a score.

In the preference table 100 illustrated in FIG. 1, when the preference rating of the user U1 is predicted with respect to the item C2, data of the other users U2-U5 is used according to aspects of the present invention. Accordingly, when the preference rating of the user U1 with respect to the item C2 is predicted, a consumption pattern of the items used by the other users U2-U5 is used in a method for collaborative filtering. For example, the preference rating may be predicted by using Equation 1 below.

$$R_{Pi} = \frac{\sum_{k=1}^{n} \{Sim(A, O_k) \times R_{ik}\}}{\sum_{k=1}^{n} Sim(A, O_k)}, \quad \text{[Equation 1]}$$

where $R_{pi}$ is a predicted preference rating of the $i^{th}$ item, A is an active user, $O_k$ denotes other users, $R_{ik}$ is a real preference rating of $O_k$ with respect to the $i^{th}$ item, n is a total number of other users, and $Sim(A, O_k)$ is a function of a similarity ratio between the active user A and other users $O_k$.

In [Equation 1], $R_{ik}$ is a real preference rating of $O_k$ with respect to the $i^{th}$ item and is represented as a constant so that the predicted preference rating of the user A with respect to the $i^{th}$ item is dependent upon an accuracy of the function $Sim(A, O_k)$. Furthermore, [Equation 1], in which preference data of other users $O_k$ are used as is, can be modified as in [Equation 2] and [Equation 3] below.

In [Equation 2], an average preference rating of the active user A and an average preference rating of other users $O_k$ are compensated for preference data of other users $O_k$:

$$R_{Pi} = \frac{\sum_{k=1}^{n} \{Sim(A, O_k) \times (R_{ik} + \overline{R_A} - \overline{R_k})\}}{\sum_{k=1}^{n} Sim(A, O_k)}, \quad \text{[Equation 2]}$$

where, $R_A$-bar is an average preference rating of the active user A and $R_k$-bar is the average preference rating of other users $O_k$.

In [Equation 3], the average preference rating of the active user A and the average preference rating of other users $O_k$ are compensated for a predicted preference rating in which [Equation 1] is used:

$$R_{Pi} = \frac{\sum_{k=1}^{n} \{Sim(A, O_k) \times R_{ik}\}}{\sum_{k=1}^{n} Sim(A, O_k)} + \overline{R_A} - \overline{R_i}, \quad \text{[Equation 3]}$$

where $R_i$-bar denotes the average preference rating of all other users $O_k$ with respect to $i^{th}$ item.

$Sim(A, O_k)$, which is a similarity ratio between the users in [Equation 1] through [Equation 3], uses a correlation coefficient, in particular, a Pearson correlation coefficient and can be represented as [Equation 4]:

$$Sim(A, O_k) = \frac{\sum_{i=1}^{n} (R_{Ai} - \overline{R_A}) \cdot (R_{Oki} - \overline{R_{Ok}})}{\sqrt{\sum_{i=1}^{n} (R_{Ai} - \overline{R_A})^2 \cdot \sum_{i=1}^{n} (R_{Oki} - \overline{R_{Ok}})^2}}, \quad \text{[Equation 4]}$$

where normalization is applied, and $R_{Ai}$ is the real preference rating of the active user A with respect to the $i^{th}$ item, $R_A$-Bar is the average real preference rating of the active user A with respect to whole items, $R_{Oki}$ is the real preference rating of other users $O_k$ with respect to the $i^{th}$ item, $R_{Ok}$-Bar is the average real preference rating of other users $O_k$ with respect to whole items, and n is the total number of items.

In addition, the similarity ratio in [Equation 4] can be represented by [Equation 5] through [Equation 8] below. As stated below, each equation can have compensated values for biased preference ratings of each one of the active users and other users:

$$Sim(A, O_k) = \sum_{i=1}^{n} (R_{Ai} - 3) \cdot (R_{Oki} - 3) \quad \text{[Equation 5]}$$

Since the preference rating is in a range of 1 to 5, [Equation 5] compensates for the biased preference ratings by the median value 3.

$$Sim(A, O_k) = \sum_{i=1}^{n} (R_{Ai} - \overline{R_A}) \cdot (R_{Oki} - \overline{R_{Ok}}) \quad \text{[Equation 6]}$$

[Equation 6] compensates for the biased preference ratings by an average value of user preference.

$$Sim(A, O_k) = \sum_{i=1}^{n} (R_{Ai} - \overline{R_i}) \cdot (R_{Oki} - \overline{R_i}) \quad \text{[Equation 7]}$$

[Equation 7] compensates for the biased preference ratings by an average value of the preference rating with respect to each item.

$$Sim(A, O_k) = \sum_{i=1}^{n} (R_{Ai} - (\overline{R_A} - \overline{R_i})/2) \cdot (R_{Oki} - (\overline{R_O} - \overline{R_i})/2) \quad \text{[Equation 8]}$$

[Equation 8] compensates for an average of user preference and the preference ratings for content items.

In the present disclosure, it is understood that an active user is a user who desires to find out estimated scores of one or more items, while an other user is a user other than the active user. Furthermore, a recommender list is a list of users having a high similarity ratio with the active user. A predicted preference rating is a predicted preference rating of an active user with respect to an item, while a real preference rating is preference rating explicitly recorded by users. A Similarity ratio (Sim(A,B)) is a similarity ratio between a user A and a user B, while an overlapping ratio (Overlap(A,B)) is an overlapping ratio of items between a user A and a user B. A Count(A) is the number of items used by a user A, while a Count(A∩B) is the number of common items used by the user A and the user B and a Count(A∪B) is the number total items used by the user A and the user B.

FIG. 2 is a flowchart of a method of predicting a user preference according to an example embodiment of the present invention. Referring to FIG. 2, a similarity ratio between a first user and a second user is measured by using an overlapping ratio of use of common items by the first user and the second user with respect to all or a part of contents (first items) in operation 210. As an example with reference to the table 100 shown in FIG. 1, the preference rating of the user U1 with respect to the item C2 is predicted. Here, the item C2 to be predicted can be regarded as a second item. In this case, the similarity ratio is measured by using an overlapping ratio of use of the first items C1 and C3-C5 by the first user, (i.e., U1) and one or more second users (i.e., U2-U5). The second item C2 currently to be predicted is excluded from the similarity ratio measurement. The similarity ratio can be measured by multiplying the overlapping ratio of use of the first items C1 and C3-C5 by a correlation coefficient between the first user U1 and the second user U2-U5. Equations for measuring the overlapping ratio and the similarity ratio are described below.

Then, a recommender list for the first user U1 is generated based on the measured similarity ratio in operation 220. The recommender list can be formed of third users (for example, U4) selected from the second users U2-U5 arranged in order of decreasing similarity ratio with the first user U1. In general, a predetermined amount of data is extracted from among the arranged second users U2-U5 in order of a high rank so that the recommender list can be formed.

Accordingly, the preference rating of the first user U1 with respect to the second item C2 is predicted based on the preference rating of the third users included in the generated recommender list with respect to the second item C2 in operation 230. In other words, the preference rating for the second item C2 can be predicted from data of the users (third users, for example, U4) included in the recommender list. In this regard, the users included in the recommender list are determined as having the most similar tastes with the first user U1.

Equation 9 below is an equation for measuring the similarity ratio (Sim'(A,B)) according to aspects of the present invention by using the overlapping ratio of use of the items:

$$Sim'(A, O_k) = Sim(A, O_k) \times Overlap(A, O_k) \quad \text{[Equation 9]}$$

The overlapping ratio (Overlap(A,$O_k$)) can be a ratio of the number of the first items commonly used by the first user and the second users to the total number of the first items used by the first user and the second users. In addition, the overlapping ratio (Overlap(A,$O_k$)) can be a ratio of the number of the first items commonly used by the first user and the second users to the total number of the first items used by the first user. In other words, the overlapping ratio can be represented by [Equation 10] below:

$$Overlap(A, O_k) = \frac{Count(A \cap O_k)}{Count(A \cup O_k)} \times \frac{Count(A \cap O_k)}{Count(A)}, \quad \text{[Equation 10]}$$

where Count(A) is the number of items used by the user A, Count(A∩$O_k$) is the number of items commonly used by the user A and other users $O_k$, and Count(A∪$O_k$) is the number of total items used by the user A and other users $O_k$.

That is, the first term of [Equation 10] (Count(A∩$O_k$)/Count(A∪$O_k$)) is a measure of how many items the user A and other users $O_k$ use in common, divided by the total number of items used by the user A and other users $O_k$. Meanwhile, the second term (Count(A∩$O_k$)/Count(A)) is multiplied by the first term in order to compensate for the first term to only provide a relative ratio with respect to overlapping used items by two users. This denotes an absolute overlapping ratio of use of the items based on the active user (i.e., user A) by obtaining the number of the items commonly used with respect to the number of the items used by the active user.

The similarity ratio (Sim'(A,B)) can be modified in various ways as illustrated in [Equation 11] through [Equation 18] below:

$$Sim(A, O_k) \times \frac{Count(A \cap O_k)}{Count(A \cup O_k)} \quad \text{[Equation 11]}$$

$$Sim(A, O_k) \times \frac{Count(A \cap O_k)}{Count(A)} \quad \text{[Equation 12]}$$

$$0.5 \times Sim(A, O_k) + 0.5 \times \frac{Count(A \cap O_k)}{Count(A \cup O_k)} \quad \text{[Equation 13]}$$

$$0.5 \times Sim(A, O_k) + 0.5 \times \frac{Count(A \cap O_k)}{Count(A)} \quad \text{[Equation 14]}$$

$$0.4 \times Sim(A, O_k) + \quad \text{[Equation 15]}$$
$$0.3 \times \frac{Count(A \cap O_k)}{Count(A \cup O_k)} + 0.3 \times \frac{Count(A \cap O_k)}{Count(A)}$$

$$\frac{Count(A \cap O_k)}{Count(A \cup O_k)} \quad \text{[Equation 16]}$$

$$\frac{Count(A \cap O_k)}{Count(A)} \quad \text{[Equation 17]}$$

$$\frac{Count(A \cap O_k)}{Count(A \cup O_k)} \times \frac{Count(A \cap O_k)}{Count(A)} \quad \text{[Equation 18]}$$

Figure 3:
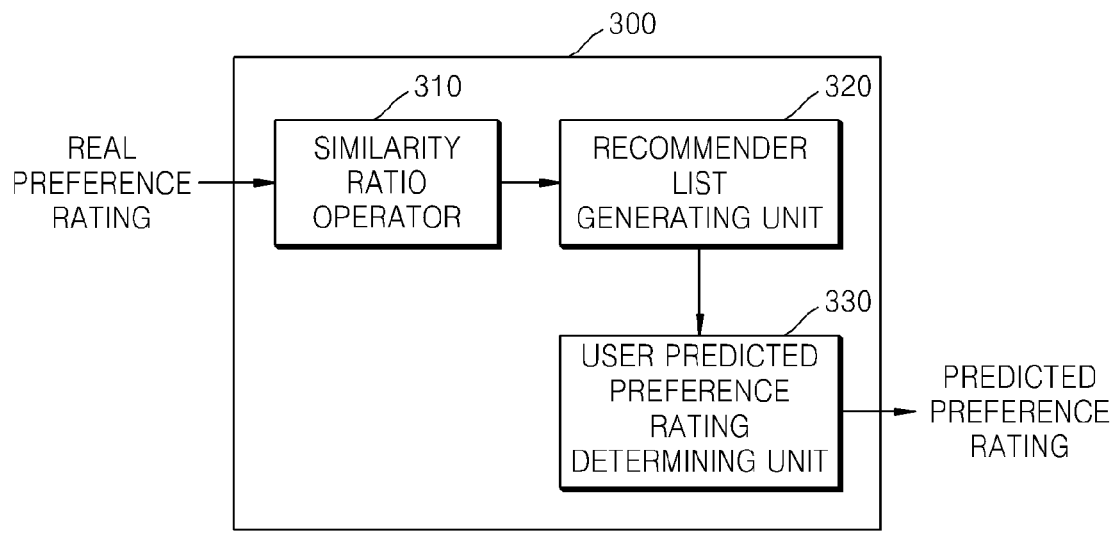
FIG. 3 is a block diagram of an apparatus for predicting a user preference, according to an example embodiment of the present invention.

FIG. 3 is a block diagram of an apparatus for predicting a user preference 300, according to an example embodiment of the present invention. Referring to FIG. 3, the apparatus for predicting a user preference 300 includes a similarity ratio operator 310, a recommender list generating unit 320, and a user predicted preference rating determining unit 330.

The similarity ratio operator 310 measures the similarity ratio of a first user and second users using an overlapping ratio of use of first items of contents used by the first user and the second users. As described above, the similarity ratio is measured by multiplying the overlapping ratio of use of the first items by a correlation coefficient between the first user and the second users.

The recommender list generating unit 320 generates a recommender list for the first user based on the measured similarity ratio. In this regard, the recommender list is formed of a predetermined number of third users selected from among the second users arranged in order of decreasing similarity ratio with the first user.

The user predicted preference rating determining unit 330 predicts the preference rating of the first user with respect to second items (i.e., items with no preference rating for the first user) based on the preference rating of the third users included in the recommender list with respect to the second items.

Figure 4:
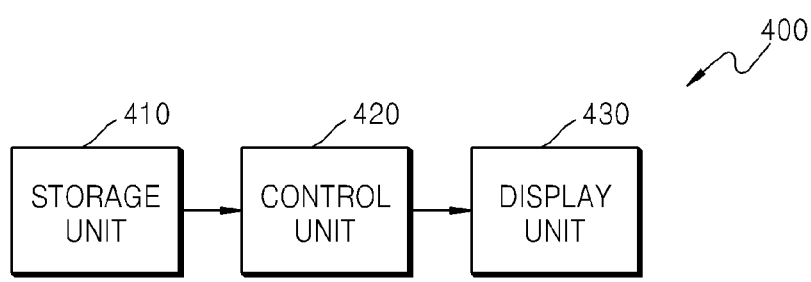
FIG. 4 is a block diagram of a multimedia content reproducing device predicting a user preference, according to an example embodiment of the present invention.

FIG. 4 is a block diagram of a multimedia content reproducing device 400 predicting a user preference, according to an example embodiment of the present invention. Referring to FIG. 4, the multimedia content reproducing device 400 includes a storage unit 410, a control unit 420, and an output device 430.

The storage unit 410 stores a plurality of contents (such as content items C1 to C5 in FIG. 1), and preference ratings of each user of the multimedia content reproducing device in regards to each content item. The control unit 420 (such as a central processing unit (CPU)) predicts a user preference of an active user for a stored content item not used by the active user according to the preference ratings stored in the storage unit 410. The control unit 420 may implement the apparatus for predicting a user preference 300 illustrated in FIG. 3. Accordingly, detailed operations of the control unit 420 will be omitted herein. The output device 430 displays the predicted user preference for the unused content item according to a control of the control unit 420. The output device may be a display screen (such as an LCD screen or the like).

The method and apparatus for predicting a user preference according to aspects of the present invention can be applied to a recommendation system so as to be used for selecting recommendable items by users. The method and apparatus for predicting a user preference according to aspects of the present invention has an improved accuracy. In particular, in measuring a similarity ratio according to the conventional method, only a similarity ratio of items commonly used by users is measured and thus accurate measurement is not possible. However, according to aspects of the present invention, the overlapping extent of items used by users is considered and, thus, the similarity ratio can be accurately measured.

Various components of the apparatus for predicting a user preference, as shown in FIG. 3, such as the similarity ratio operator 310, the recommender list generating unit 320, and the user predicted preference rating determining unit 330, can be integrated into a single control unit, or alternatively, can be implemented in software or hardware, such as, for example, a field programmable gate array (FPGA) or an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the generating of a recommender list may be omitted or replaced by other methods of determining assessing the measured similarity ratios to determine a most similar other user. Accordingly, it is intended, therefore, that the present invention not be limited to the various example embodiments disclosed, but that the present invention includes all embodiments falling within the scope of the appended claims.

What is claimed is:

1. A method of predicting a user preference of an active user for an unused content item not used by the active user, the method comprising:
   measuring a first similarity ratio of the active user and a first other user using an overlapping ratio of use of content items commonly used between the active user and the first other user, and measuring a second similarity ratio of the active user and a second other user using the overlapping ratio of use of content items commonly used between the active user and the second other user;
   generating a recommender list using a gate array or an integrated circuit for the active user based on the measured first and second similarity ratios; and
   predicting a preference rating of the active user with respect to the unused content item based on a preference rating of the first or second other user included in the recommender list with respect to the unused content item.

2. The method as claimed in claim 1, wherein the measuring of the first and second similarity ratios comprises, for each of the similarity ratios, multiplying the overlapping ratio of use of the content items by a correlation coefficient between the active user and the corresponding other user.

3. The method as claimed in claim 2, wherein the overlapping ratio of use is a ratio of a number of the content items commonly used by the active user and the corresponding other user to a total number of content items used by the active user and the corresponding other user.

4. The method as claimed in claim 2, wherein the overlapping ratio of use is a ratio of a number of the content items commonly used by the active user and the corresponding other user to a total number of content items used by the active user and the corresponding other user, multiplied by the ratio of the number of the content items commonly used by the active user and the corresponding other user to a total number of content items used by the active user.

5. The method as claimed in claim 2, wherein the recommender list includes the first other user and the second other user arranged in order of decreasing similarity with the active user according to the measured first and second similarity ratios.

6. The method as claimed in claim 5, wherein the predicting of the preference rating of the active user with respect to the unused content item comprises using the preference rating of the other user having a greatest similarity with the active user according to the recommender list with respect to the unused content item.

7. The method as claimed in claim 6, wherein the correlation coefficient is a Pearson correlation coefficient.

8. The method as claimed in claim 1, wherein the overlapping ratio of use of the content items commonly used considers an overlapping extent of use of the content items commonly used by the active user and the corresponding other user.

9. The method as claimed in claim 1, wherein the unused content item is a multimedia content item.

10. A non-transitory computer-readable recording medium encoded with the method of claim 1 and implemented by a computer.

11. An apparatus for predicting a user preference of an active user for an unused content item not used by the active user, the apparatus comprising:
    a similarity ratio operator to measure a first similarity ratio of the active user and a first other user using an overlapping ratio of use of content items commonly used between the active user and the first other user, and to measure a second similarity ratio of the active user and a second other user using the overlapping ratio of use of content items commonly used between the active user and the second other user;
    a recommender list generating unit to generate a recommender list for the active user based on the measured first and second similarity ratios; and
    a user predicted preference rating determining unit to predict a preference rating of the active user with respect to the unused content item based on a preference rating of the first or second other user included in the recommender list with respect to the unused content item.

12. The apparatus as claimed in claim 11, wherein the similarity ratio operator measures the first and second similarity ratios by multiplying, for each of the similarity ratios, the overlapping ratio of use of the content items by a correlation coefficient between the active user and the corresponding other users.

13. The apparatus as claimed in claim 12, wherein the overlapping ratio of use is a ratio of a number of the content items commonly used by the active user and the corresponding other user to a total number of content items used by the active user and the corresponding other users.

14. The apparatus as claimed in claim 12, wherein the overlapping ratio of use is a ratio of a number of the content items commonly used by the active user and the corresponding other user to a total number of content items used by the active user and the corresponding other users, multiplied by the ratio of the number of the content items commonly used by the active user and the corresponding other user to a total number of content items used by the active user.

15. The apparatus as claimed in claim 12, wherein the recommender list includes the first other user and the second other user arranged in order of decreasing similarity with the active user according to the measured first and second similarity ratios.

16. The apparatus as claimed in claim 15, wherein the user predicted preference rating determining unit predicts the preference rating of the active user with respect to the unused content item by using the preference rating of the other user having a greatest similarity with the active user according to the recommender list with respect to the unused content item.

17. The apparatus as claimed in claim 16, wherein the correlation coefficient is a Pearson correlation coefficient.

18. The apparatus as claimed in claim 11, wherein the overlapping ratio of use of the content items commonly used considers an overlapping extent of use of the content items commonly used by the active user and the corresponding other user.

19. The apparatus as claimed in claim 11, wherein the unused content item is a multimedia content item.

20. A method of predicting a user preference of an active user for an unused content item not used by the active user, the method comprising:
    measuring a first similarity ratio of the active user and a first other user using an overlapping ratio of use of content items commonly used between the active user and the first other user, and measuring a second similarity ratio of the active user and a second other user using the overlapping ratio of use of content items commonly used between the active user and the second other user;
    determining a most similar other user using a gate array or an integrated circuit from among the first and second other users according to the measured first and second similarity ratios; and
    predicting a preference rating of the active user with respect to the unused content item based on a preference rating of the most similar other user with respect to the unused content item.

21. The method as claimed in claim 20, wherein the overlapping ratio of use is a ratio of a number of the content items commonly used by the active user and the corresponding other user to a total number of content items used by the active user and the corresponding other user, multiplied by the ratio of the number of the content items commonly used by the active user and the corresponding other user to a total number of content items used by the active user.

22. A non-transitory computer-readable recording medium encoded with the method of claim 20 and implemented by a computer.

23. An apparatus for predicting a user preference of an active user for an unused content item not used by the active user, the apparatus comprising:
    a similarity ratio operator to measure a first similarity ratio of the active user and a first other user using an overlapping ratio of use of content items commonly used between the active user and the first other user, and to measure a second similarity ratio of the active user and a second other user using the overlapping ratio of use of content items commonly used between the active user and the second other user;
    a most similar other user determiner to determine a most similar other user from among the first and second other users according to the measured first and second similarity ratios; and
    a user predicted preference rating determining unit to predict a preference rating of the active user with respect to the unused content item based on a preference rating of the most similar other user with respect to the unused content item.

24. The apparatus as claimed in claim 23, wherein the overlapping ratio of use is a ratio of a number of the content items commonly used by the active user and the corresponding other user to a total number of content items used by the active user and the corresponding other users, multiplied by the ratio of the number of the content items commonly used by the active user and the corresponding other user to a total number of content items used by the active user.

25. A method of predicting a user preference of an active user for an unused content item not used by the active user, the method comprising:
    measuring a first similarity ratio of the active user and a first other user and a second similarity ratio of the active user and a second other user, the first and second similarity ratios considering an overlapping extent of use of content items commonly used by the active user and the corresponding other user;
    determining a most similar other user with a gate array or an integrated circuit from among the first and second other users according to the measured first and second similarity ratios; and
    predicting a preference rating of the active user with respect to the unused content item based on a preference rating of the first or second other user included in the recommender list with respect to the unused content item.

* * * * *